US008886910B2

(12) United States Patent
Mehra et al.

(10) Patent No.: US 8,886,910 B2
(45) Date of Patent: Nov. 11, 2014

(54) STORAGE DEVICE DRIVERS AND CLUSTER PARTICIPATION

(75) Inventors: Karan Mehra, Sammamish, WA (US); Rajeev Nagar, Sammamish, WA (US); Shiv Rajpal, Sammamish, WA (US); Darren Moss, Redmond, WA (US); Andrea D'Amato, Kirkland, WA (US); Alan Warwick, Bellevue, WA (US); Vyacheslav Kuznetsov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 13/230,827

(22) Filed: Sep. 12, 2011

(65) Prior Publication Data

US 2013/0067188 A1   Mar. 14, 2013

(51) Int. Cl.
*G06F 12/00*    (2006.01)
*G06F 3/06*    (2006.01)
*G06F 9/44*    (2006.01)

(52) U.S. Cl.
CPC ............ *G06F 3/0605* (2013.01); *G06F 9/4411* (2013.01); *G06F 3/0632* (2013.01); *G06F 3/0689* (2013.01)
USPC ............ 711/170; 711/112; 711/114; 711/154; 711/156; 714/6.2; 714/6.32; 719/321; 719/325; 719/326; 719/327

(58) Field of Classification Search
CPC .............................. G06F 9/4411; G06F 3/0689
USPC ........... 711/170, 112, 114, 154, 156; 714/6.2, 714/6.32; 719/325, 326, 327, 321
See application file for complete search history.

(56) References Cited

U.S. PATENT DOCUMENTS 6,640,278 B1 * 10/2003 Nolan et al. ...................... 711/6
6,912,627 B2 * 6/2005 Matsunami et al. .......... 711/154
7,484,039 B2   1/2009 Qiu
(Continued)

FOREIGN PATENT DOCUMENTS

CN    102945139 A    2/2013

OTHER PUBLICATIONS

"IBM XIV: Storage Architecture Evolution for High Performance", Published: Nov. 2008, pp. 1-10, http://www.xivstorage.com/materials/analysts/taneja_brief_nov08.pdf.

(Continued)

*Primary Examiner* — Stephen Elmore
(74) *Attorney, Agent, or Firm* — John Jardine; Andrew Sanders; Micky Minhas

(57) ABSTRACT

The representation of storage devices on computers (e.g., as logical volumes) may be complicated by the pooling of multiple storage devices in order to apply redundancy plans such as mirroring and checksumming. Presented herein is a storage device driver configured to operate as a storage device interface generating representations of the storage regions of the storage devices; to claim those regions as a storage controller; and to expose pooled storage regions as logical disks. Additionally, the storage device driver may support the inclusion of storage devices in a cluster, comprising nodes that may be appointed as managers of the storage pool configuration; as managers of the storage devices; as owners having exclusive read/write access to the storage pool or cluster resources; and as cluster resource writers having exclusive write access to a cluster resource. The nodes of the cluster may interoperate to share the storage devices while avoiding write conflicts.

24 Claims, 8 Drawing Sheets

(56) References Cited

U.S. PATENT DOCUMENTS

| | | |
|---|---|---|
| 7,747,836 B2 | 6/2010 | Rajan |
| 7,779,118 B1 * | 8/2010 | Artzi et al. .................... 709/224 |
| 7,809,739 B2 * | 10/2010 | Allen et al. ................... 707/758 |
| 8,176,289 B2 * | 5/2012 | Frank ............................ 711/170 |
| 8,244,956 B2 * | 8/2012 | Laor et al. ......................... 711/6 |
| 2004/0215879 A1 * | 10/2004 | Matsunami et al. .......... 711/114 |
| 2006/0129998 A1 * | 6/2006 | Florissi et al. ................ 717/127 |
| 2008/0098171 A1 | 4/2008 | Balasubramanian |
| 2009/0183183 A1 * | 7/2009 | Muppirala et al. ............ 719/327 |
| 2010/0042663 A1 | 2/2010 | Dudgeon |
| 2010/0082900 A1 * | 4/2010 | Murayama et al. ........... 711/114 |

OTHER PUBLICATIONS

"Hitachi TagmaStore Universal Storage Platform and Network Storage Controller", May 3006, Hitachi Data Systems Corporation, http://www.sprectra.com/pdfs/tagmastore_usp.pdf, 7 pgs.

* cited by examiner

STORAGE DEVICE DRIVERS AND CLUSTER PARTICIPATION

BACKGROUND

Within the field of computing, many scenarios involve the generation of logical representations of storage devices on a computer. As a first example, a locally attached hard disk drive may be attached to a computer using a bus, and may interface with the computer through a storage device driver that presents one or more partitions of the hard disk drive to the computer as a logical volume. As a second example, a network-attached storage (NAS) appliance, such as a Redundant Array of Inexpensive Disks (RAID) array, may be loaded with hard disk drives and may communicate with over a network with a computer, which may mount a volume exposed by the NAS appliance as a network volume. As a third example, a virtual hard disk drive (VHD) may be generated as a block of storage allocated on another device, and may be presented to the computer as a virtual volume. These and other examples may suggest that a variety of physical and virtual storage devices with varying properties and interfaces may be presented to a computer. In order to reduce the complexity of interacting with this variety of storage devices, the computer may specify a logical representation standard, such that a driver may present a logical representation of the storage device that the computer may utilize as storage in a comparatively standard manner, irrespective of the type, location, characteristics, or complexity of the underlying storage device.

Also within the field of computing, many scenarios involve a cluster of interoperate nodes connected by a network, such as a server farm of devices that cooperatively provide a service. In these scenarios, the nodes may share one or more storage pools, and may establish protocols for using such storage devices (e.g., in order to reduce write conflicts and deadlocks). The storage pools may be provided by the shared capacity of one or more storage devices, each of which may be connected to a storage device and/or to the network, and the capacity provided by such storage devices may be aggregated in many ways.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A storage device may be utilized by one or more computers in a large variety of ways. As a first example, the entire capacity of a storage device may be allocated for a single logical volume, or may be partitioned and exposed as two or more logical volumes. As a second example, the capacity of a first storage device may be pooled with the storage capacity of a second storage device (e.g., in a spanning or striping arrangement). As a third example, a storage pool that aggregates the capacity of two or more storage devices may be created with a resiliency plan that enables features such as recovery in the event of a storage device failure, error detection, and error correction. Such resiliency plans may include a mirroring plan, wherein an identical copy of a data set is stored on each storage device, and a parity plan, wherein data stored on some devices may be backed by one or more parity calculations (e.g., checksums) stored on other devices, so that if any storage device fails or becomes unavailable, the data stored on the storage device may be reconstructed using the corresponding data and corresponding parity calculations stored on the other storage devices. As a fourth example, it may be advantageous to segment the capacity of a storage device into different storage pools; e.g., a particular storage device may allocate some capacity to a first pool aggregated with capacity from a first set of storage devices, and some additional capacity to a second pool aggregated with capacity from a different set of storage devices, and the remaining capacity to an unpooled logical representation. As a fifth example, the storage device may be shared by and concurrently accessible to several computers, such as the nodes of a cluster, which may have to intercommunicate and use the storage device in a manner that reduces write conflicts, resiliency inconsistencies, and deadlocks. Moreover, it may be advantageous to expose the storage device to one or more computers not through a specialized storage controller that operates in a comparatively isolated and opaque manner, but through a software interface that may robustly interact with the computing environment.

Presented herein are techniques for representing storage devices on a computer that may facilitate many of these scenarios. In accordance with the techniques presented herein, a computer may include a storage device driver that implements a set of layers that present the storage devices to the operating environment of the computer in different contexts. In particular, the storage device driver comprises a storage device interface component, which interacts with a storage device in a low-level manner (e.g., issuing read and write requests, handling buffer semantics such as flushing, and applying the addressing protocol of the storage device), and that exposes a set of storage region representations of the storage regions of the storage device (e.g., representations of the partitions or capacity slabs allocated on the storage device); a storage controller driver component that claims storage region representations, applies the capabilities of storage device relationships (e.g., capacity pooling and resiliency schemes), and presents a pooled storage region representation; and a storage port driver component that claims pooled storage region representations and presents to the operating environment logical representations of the pooled storage regions of the storage devices. The architecture of the storage device driver may therefore enable considerable flexibility in the provisioning of a set of storage devices, and may expose respective storage devices to the operating environment as several different representations that enable both simplified utilization and rich information as to the provisioning and utilization of the storage device. Additionally, these capabilities may be implemented as a storage device driver within the operating environment of the computer, thereby reducing the involvement of specialized hardware components that may isolate and complicate the storage scenario.

The techniques presented herein also relate to the exposure of the storage device to a cluster of nodes that may cooperatively utilize the storage device. In such scenarios, the storage device driver may be further configured to facilitate clustering considerations, such as administration of a storage pool or cluster resource and the negotiation of ownership and permissions among the nodes. These and other advantages may be achieved through the architecture and configuration of a storage device driver that may present storage devices within the operating environment of a computer in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
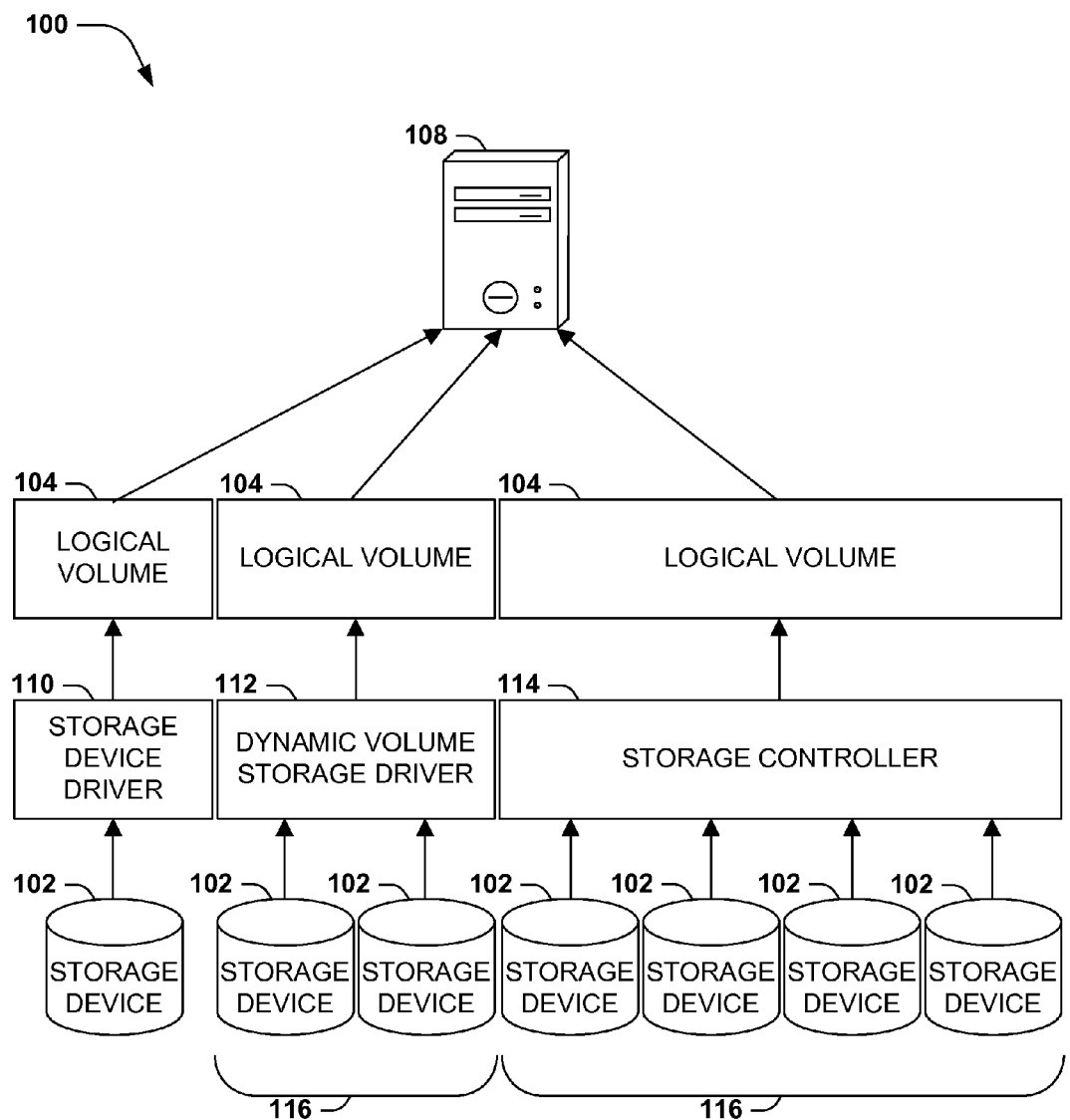
FIG. 1 is an illustration of an exemplary scenario featuring a representation of a set of storage devices on a computer.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the representation of storage devices on a computer. As a first example, a hard disk drive or a solid-state storage device may be directly attached to a computer, such as using a Serial ATA (SATA) connector or a Universal Serial Bus (USB) connector, and a storage device driver provided on a firmware of the storage device may perform the tasks involved in exposing the storage device within the operating environment of the computer. The capacity of the hard disk drive may be completely allocated as a single logical volume, or may be partitioned or otherwise segmented into two or more subsets of capacity that may each be exposed as logical volumes. As a second example, a computer may comprise one or more optical disc drives (e.g., DVD-ROM drives), and the storage device drivers of the optical disc drives may interoperate with other components of the operating environment (e.g., disc burning applications) to expose the capabilities of the optical disc drive (e.g., optical disc erase and printing techniques) as well as the limitations thereof (e.g., high latency and limited random write access). As a third example, one or more hard disk drives may be loaded into a storage appliance, which may manage the hard disk drives and present a pooled representation to the computer. As one example, in a Redundant Array of Inexpensive Disks (RAID) appliance, a RAID controller manages an array of hard disk drives by exchanging I/O requests, monitoring the status and health of the hard disk drives, and applying a variety of features. For example, the RAID controller may generate a logical volume isolate don one hard disk drive; a logical volume that that spans two or more of hard disk drives (in a sequential or striped manner); a logical volume that is mirrored on two or more hard disk drives (e.g., where a data set is stored as an identical copy on each storage device); and a logical volume that, upon writing a data set to some storage devices, writes a parity calculation of the data set to another storage device, so that, in the event of an abrupt failure, disconnection, or other type of inaccessibility of a storage device, the data on the inaccessible storage device may be reconstructed using the corresponding data and the parity calculations on the other storage devices). However, the RAID controller may abstract away many of the details of the storage device array, and may represent the array within the operating environment of a computer as a single network volume. As a fourth example, a virtual hard drive (VHD) may be generated from the storage capacity of one or more other storage devices. The VHD may be presented to the operating environment as a simulation of a physical storage device, and the storage device driver for the VHD may translate access requests for respective addresses within the VHD into requests targeted at the storage devices providing the capacity for the VHD including the specified addresses.

These and other types of storage devices may present an indication of the variety of storage devices that may be attached to a computer. Configuring the operating environment of a computer to interact with each storage device in a specialized manner, in view of the characteristics of the storage device, may be very difficult, particularly since new types, features, and properties of storage devices are frequently developed. Rather, the complexity of such variety may be managed in at least two ways. First, the operating environment may be configured not to interact directly with a storage device, but interact with a storage device driver that is configured to translate specialized interactions with the storage device (e.g., burst access capabilities to hard disk drives, flush semantics of write buffers, and burn and wipe semantics of optical disc drives) into comparatively generalized operations (e.g., Read, Write, Format, and List Contents). Second, the operating environment may define a logical representation of storage devices that are to be exposed by all storage device drivers for all storage devices. Such logical representations may enable an enumeration of storage devices by the operating environment and a comparatively uniform interaction by the operating environment with each storage device, irrespective of the particular properties thereof.

FIG. 1 presents an illustration of an exemplary scenario 100 featuring a set of storage devices 102 that are accessible to a computer 108. The storage devices 102 may have different characteristics (e.g., available and used capacity, access rates, latency, volatility, and transactional write capabilities) and may be engineered based on varying design models (e.g., hard disk drives, solid-state storage circuits, and optical discs). However, the computer 108 is configured to interact with each storage device 102 in a comparatively standardized manner, e.g., by querying the storage device 102 for capacity, formatting the storage device 102 with a storage system such as a file system or database system, provisioning and/or allocating the capacity of the storage device 102, and issuing Read and Write requests to utilize the allocated capacity of the storage device 102). In order to achieve this standardization, respective storage devices 102 may interface with the computer 108 through a particular component, which may expose the storage capacity to the computer 108 in a simplified manner. For example, a first storage device 102 may include a storage device driver 110 that claims the entire storage device 102 and exposes it to the computer 108 as a logical volume 104. Two additional storage devices 102 may be selected to interoperate as a storage pool 116, wherein the capacity of the storage devices 102 is aggregated into a unified logical volume 104 in a spanned manner (e.g., where the first half of a sequential address space is stored on the first storage device 102 and the second half of the address space is stored on the second storage device 102) or in a striped manner (e.g., where the address space is allocated across the storage devices 102 in an alternating manner). The dynamic volume storage driver 112 may therefore claim both storage devices 102 and generate a representation of the pooled capacity as a logical volume 104. When the computer 108 issues a request to write to a particular translate requests to access a particular logical address within the logical volume 104, the dynamic volume storage driver 112 may identify the physical address on one of the two storage devices 102 corresponding to the logical address, and may issue the translated access request to the corresponding storage device 102. A third set of four storage device 102 may be aggregated into a storage pool 116 that is managed by a storage controller 114, such as a RAID controller. The storage controller 114 may automatically apply various storage features to the storage devices 102 of the storage pool 116, such as a selected aggregation plan and/or a selected resiliency plan; may monitor and report on the health of the storage devices 102 (e.g., detecting an imminent failure of a storage device 102); and may automatically perform maintenance operations on such storage devices 102, such as a reconstruction of data onto a storage device 102 substituting for a failed, disconnected, or removed storage device 102. However, to the computer 108, the storage controller 114 may represent the entire storage pool 116 as a logical volume 104. The various storage device drivers and storage controllers may therefore achieve a standardization of the storage mechanisms of the computer 108, and may transform the complex interrelationships and features of the storage devices 102 and storage pools 116 as a simple set of capacity stores.

As an additional complication, a storage device 102 may be concurrently accessible to a set of computers 108 with various degrees of interoperation. In particular, a set of computers 108 may be configured to interoperate as the nodes of a cluster. The cluster may be provided to achieve various tasks, such as shared computational capacity for high-performance computing applications and concurrent processing capabilities that provide a service to a large set of users and/or devices. Such clusters may also be configured with many sophisticated features, such as failover capabilities where the responsibilities of a node that crashes, becomes disconnected from the cluster, or otherwise fails may be automatically and promptly assumed by a substitute node, thereby reducing the interruption in the provision of the services that were assigned to the failed node. In particular, a cluster of nodes may interact with one or more storage devices 102, and may have concurrent access thereto. However, unrestricted and uncoordinated access by the nodes of the cluster to the storage devices 102 may result in many problems, including write conflicts (e.g., a race condition between two or more data sets concurrently writing to a particular location of a storage device 102, resulting in a non-deterministic outcome and inconsistently written data, such as an arbitrary amalgamation of disparate data sets written to the same location by different nodes of the cluster); redundancy failures (e.g., a failure of a resiliency scheme, such as a party calculation technique, caused by race conditions and resulting in failures of resiliency guarantees and potential data corruption); and deadlocks (e.g., an exclusive locking of a data set or storage device 102 by a first node that causes problems for other nodes endeavoring to access the data set or storage device 102). Moreover, it may be desirable to provision a storage device 102 to participate in two or more storage pools 116, and/or to communicate with the nodes of two or more clusters. Configuring an operating environment in a flexible manner that enables such complex scenarios may represent a difficult task.

Figure 2:
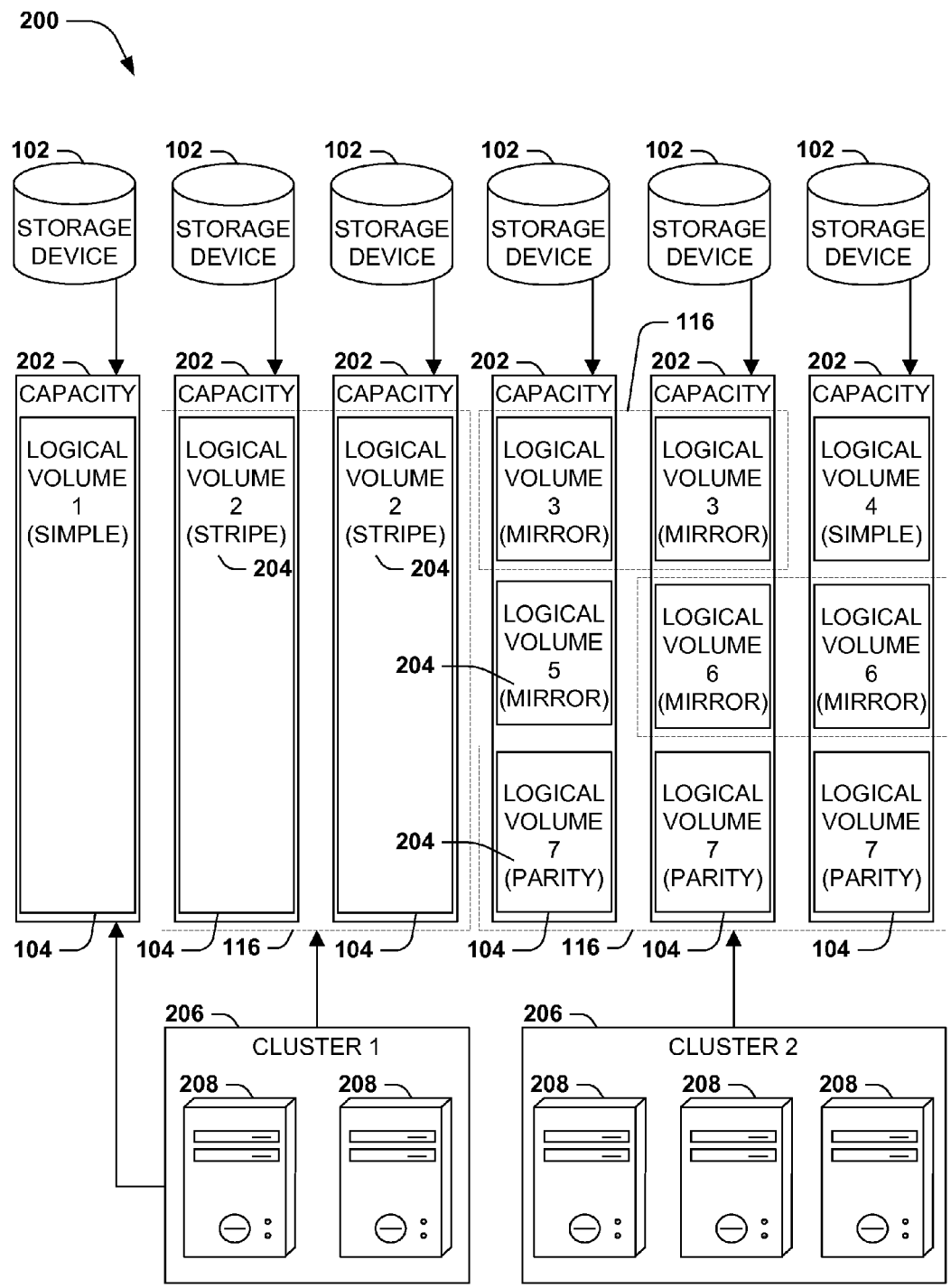
FIG. 2 is an illustration of an exemplary scenario featuring a set of storage devices grouped into storage pools and accessed by respective clusters of nodes.

FIG. 2 presents an illustration of an exemplary scenario 200 featuring the provisioning of the capacity of a set of storage devices 102 to communicate with two clusters 206 of nodes 208. In this exemplary scenario 200, six storage devices 102 are provided, and the storage capacity 202 of each storage device 102 is apportioned into respective logical volumes 104. In particular, the provisioning of storage capacity 202 between storage devices 102. For example, a first storage device 102 may be allocated entirely as a single logical volume 104 that is accessible to a single computer 108. However, Moreover, the storage capacity 202 of other storage devices 102 may be aggregated into one or more storage pools 116, each of which may specify a particular set of storage features 204. For example, a first storage pool 116 may be striped across the second and third storage devices 102, while a second storage pool 116 may specify a mirroring relationship, wherein identical data is stored within the storage capacity 202 of each storage device 102 that is allocated for the mirrored storage pool 116. Such storage pools may be exposed (exclusively or non-exclusively) to a cluster 206 of nodes 208 for use in providing the services of the cluster 206. For example, a cluster 206 may provide an email hosting service that utilizes a distributed database, and the capacity for the distributed database may be provided by a storage pool 116 that implements various storage features 204 in furtherance of the service (e.g., high throughput, fault resiliency, and high availability). The nodes 208 may also occupy various roles within the cluster 206 (e.g., a data-driven application may include a first set of nodes 208 operating as data servers, a second set of nodes 208 applying a business logic, and a third set of nodes 208 operating as a front end), and may implement various sets of permissions and trust levels in the context of those rules. The storage devices 102 may therefore have to support the complex configuration of the cluster 206, as well as the storage features 204 of the storage pools 116 allocated to the cluster 206. Moreover, it may be desirable to configure a storage device 102 to allocate different portions of storage capacity 202 for different storage pools 116, each of which may have different storage features 204 (e.g., the storage capacity 202 of the sixth storage device 102 is partitioned into an isolated logical volume 104 and two portions respectively participating in different storage pools 116 with different storage features 204).

In view of the complexities in the configuration of sets of storage devices 102, storage pools 106 among storage devices 102, and interoperation with clusters 206 of nodes 208, it may be difficult to configure the storage devices 102 and the computers 108 (both individually and as a node 208 of a cluster 206) to fulfill such complexities in a performant manner, while also reducing the administrative complexity and simplifying the logical representations of the storage devices 102 and the availability of provisioned capacity. Some of these complexities may be resolved, e.g., by encapsulating some functionality in a specialized hardware controller, such as a RAID storage controller, that may implement selected storage features 204 for various storage devices 102 while presenting a simplified representation to a computer 108. However, the simplicity achievable through a specialized hardware controller may present several disadvantages. As a first example, specialized hardware involves an additional acquisition and operating cost, as well as specialized administration and user training. As a second example, the specialized hardware may impose additional limitations on the storage devices 102. For example, RAID controllers often involve an exclusive claim of the entire storage capacity 202 of the storage devices 102 participating in a single storage pool, which may be incompatible with the diverse configuration of each of the fourth, fifth, and sixth storage devices 102 in the exemplary scenario 200 of FIG. 2. As a third example, the simplicity provided by a RAID controller may also represent an abstraction of the details of the storage devices 102 and the obfuscation of information that may be of value to a computer 108 or to a node 208 of a cluster 206. For example, the cause of poor performance exhibited by a storage pool 116 while accessing to a particular data set may be identified by examining where and how the data set is stored on the storage devices 102. However, the RAID controller may abstract away such information, and it may be difficult to determine where the data set is located or how it is being accessed through the RAID controller. As a fourth example, hardware controllers may be difficult to update with new functionality; e.g., a high-performance cluster 206 may involve a specialized data access technique, but a hardware controller may not be robustly configurable or sufficiently flexible to implement the technique, whereas a software-based controller of the storage devices 102 may be readily configurable. These and other factors may encourage a reduction of hardware components in the control of storage devices 102 in complex storage scenarios.

B. Presented Techniques

Presented herein are techniques for representing storage devices 102 on a computer 108 that may enable some advantages over other representation techniques. In accordance with these techniques, a storage device driver may be devised that is capable of interacting with storage device 102 while applying many types of storage features 204, and that may represent storage devices 102 in a simplified and standardized manner (e.g., as a logical representation 318, such as a logical disk) while also exposing the underlying details of the storage devices 102 (e.g., the aggregation of a set of storage devices 102 into a storage pool 116, and the accessing of the storage devices 102 by a cluster 206 of nodes 208 having various clustering circumstances). Moreover, the storage device driver may be implemented as a software driver, and may provide these robust features while fully conforming with an existing storage device driver architecture of an operating environment, and may operate alongside conventional storage device drivers supporting and representing other storage devices 102.

In particular, the techniques presented herein involve the representation of a storage device 102 on a computer 108 through a particular architecture of layers, each of implementing a particular sets of storage features 204, and expose one or more storage devices 102 in a different context. For example, the techniques may be implemented as a software driver comprising, at a low level, a storage device interface component configured to generate a storage region representation of respective storage regions of respective storage devices 102. The storage region representations may comprise, e.g., a low-level representation within the operating environment of the computer 108 of an existing storage region of the storage device 102 (e.g., a physical address range, a partition, or a capacity slab). The software driver may also include, at a middle level, a storage controller driver component that is configured to aggregate respective storage regions into storage pools 116, and may implement various storage features 204 of the storage pool 116 (e.g., applying a mirroring resiliency plan by translating each receive write request into identical requests directed to different storage regions of different storage devices 102). Additionally, the storage controller driver component may claim the storage region representations of storage regions that are involved in the storage pool (e.g., indicating within the operating environment of the computer 108 that the storage region is reserved and exclusively used by the storage controller driver component, and is not available for access by other components), and may expose the storage pool 116 as a pooled storage region representation (e.g., a representation within the operating environment of the computer 108 of the storage pool 116, optionally indicating the characteristics of the storage pool 116, such as implemented storage features 204). The storage device driver may also include, at an upper level, a storage port driver component that is configured to generate a logical representation from the pooled storage region representations generated by the storage controller driver component. For example, the storage port driver component may represent the storage pool 116 within the operating environment of the computer 108 as a logical disk.

Figure 3:
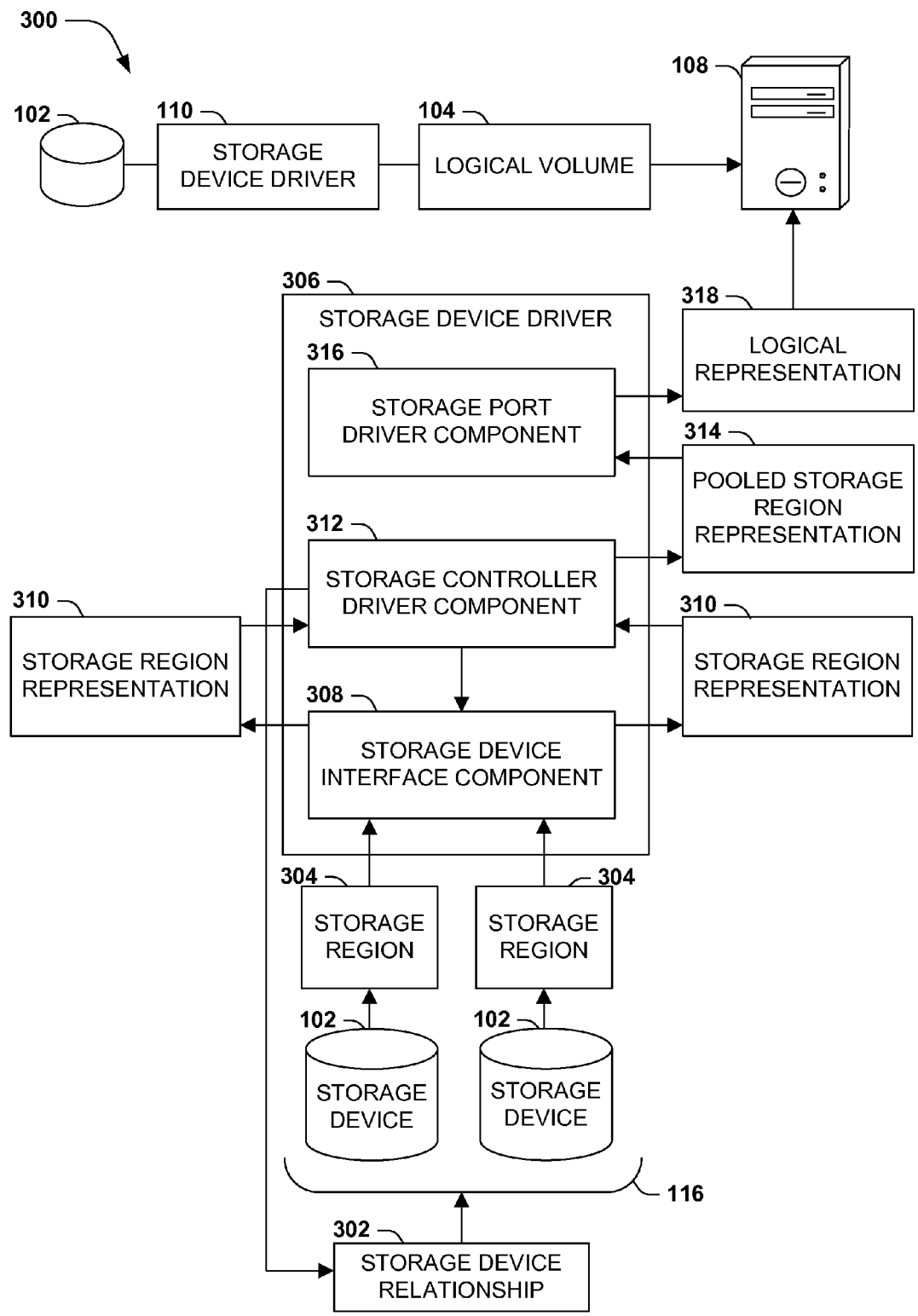
FIG. 3 is an illustration of an exemplary storage device driver representing storage devices within the operating environment of a computer in accordance with the techniques presented herein.

FIG. 3 presents an illustration of an exemplary scenario 300 featuring a representation of storage devices 102 on a computer 108 in accordance with the techniques presented herein. In this exemplary scenario 300, a set of two storage devices 102 (at bottom) is accessible to a computer 108, and is to be represented thereupon. Moreover, the storage devices 102 may present a set of one or more storage regions 304, and may be provisioned for aggregation as a storage pool 116, and may have a particular storage device relationship 302 (e.g., one or more storage features 204, such as a striping relationship, a mirroring relationship, or a checksumming relationship, or other types of relationships, such as a primary/secondary relationship or a failover relationship). The techniques presented herein may be utilized to represent the storage regions 304 of the storage devices 102 within the operating environment of the computer 108 by providing a storage device driver 306 that is configured in the following manner. The storage device driver 306 includes a storage device interface component 308 that is configured to interact with the storage devices 102 at a low level, e.g., by issuing access requests to the storage devices 102, negotiating the addressing scheme of each storage device 102, and handling write cache and buffer semantics (e.g., interacting with a read cache and flushing a write cache). The storage device interface component 308 may generate a storage region representation 310 of each storage region 304 of the storage device 102 (e.g., indicating the existence and characteristics of each storage region 304 within the operating environment of the computer 108). The storage device driver 306 also includes a storage controller driver component 312, which may be configured to aggregate two or more storage region representations 310 into a storage pool 116, and may also implement the details of a storage device relationship 302 (e.g., directing respective write requests to both storage regions 304 in order to satisfy a mirroring storage device relationship 302). The storage controller driver component 312 may also be configured to claim the storage region representations 310 (e.g., indicating to other processes within the operating environment of the computer 108 that the represented storage regions 304 are reserved for the storage pool 116, and are not available to other processes for storage), and to generate a pooled storage region representation 314 (e.g., indicating the existence of the storage pool 116 within the operating environment of the computer 108, optionally including details about the storage pool 118, such as its available and used capacity and the storage features 204 implemented therein). The storage device driver 306 also includes a storage port driver component 316 that represents the pooled storage region representation 314 within the operating environment of the computer 108 as a logical representation 318 (e.g., as a logical disk). The storage port driver component 316 may therefore expose the represented storage pool 116 as a simple capacity store.

As depicted in the exemplary scenario 300 of FIG. 3, the techniques presented herein may present many advantages over other representations of the storage devices 102. As a first example, the architecture of the techniques as a storage device driver 306 may enable this rich feature set to be implemented within the existing storage driver architecture of many computers 108, and to operate alongside conventional storage device drivers 110 (e.g., the simple storage device driver 110 depicted in FIG. 3 that simply represents a single storage device 102 as a logical volume 104). However, this exemplary storage device driver 306 also exposes several representations of the storage devices 102, including storage region representations 310 for the storage regions 304 of the storage devices 102, a pooled storage region representation 314 for the storage pool 116, and a logical representation 318 in the manner of a storage port driver. This layered presentation enables individuals and processes of the computer 108 to examine the storage devices 102 in different contexts and at varying levels of detail, including the top-level representation of a simple capacity store, a mid-level representation of the storage pool 116 and the storage features 204 implemented therein, and a low-level representation of the storage devices 102 and the storage regions 304 implemented thereupon. In addition, representing the storage devices 102 in a layered manner enables robust flexibility in the configuration of storage regions of storage devices 102 as storage region representations; in the pooling of storage region representations into storage pools 116 having various sets of storage features 204; and the exposure and use of a storage pool 116 as a logical representation that may be apportioned and utilized in many ways. Moreover, because the storage device driver 306 of the storage device 102 executing within the operating environment of the computer 108 is aware of the rich complexities of the storage scenario, the storage device driver 306 may, at various layers, implement additional features. For example, if the computer 108 is a node 208 of a cluster 206, and if a storage device 102 and/or storage pool 116 is accessed by the computer 108 as part of the cluster 206, the storage device driver 306 may implement features of the clustering environment (e.g., verifying permissions and access rights, and notifying other nodes 208 of the cluster 206 of such accesses), and may do so at the device driver level, thereby achieving the implementation of complex storage scenario details in the fundamental and comprehensive accessing of the storage devices 102 at the level of a storage device driver 306. These and other advantages may be achievable through the representation of storage devices 102 on a computer 108 in accordance with the techniques presented herein.

C. Exemplary Embodiments

FIG. 3 presents an illustration of a first exemplary embodiment of these techniques, illustrated as an exemplary storage device driver 306 configured to represent storage devices 102 accessible to a computer 108. The storage device driver 306 comprises a set of interoperating components, where respective components may be implemented, e.g., as a set of instructions stored in a memory component of the computer 108 (e.g., a memory circuit, a platter of a hard disk drive, a solid-state storage device, or a magnetic or optical disc) that, when executed, implement within the operating environment of the computer 108 a storage device driver 306 that generates representations of storage devices 102 within the computer 108. The storage device driver 306 may be provided a storage plan (e.g., a specification provided by a user to indicate how the storage devices 102 are to be aggregated into storage pools 116, storage features 204, and/or logical representations 31), and may implement the storage plan according to the techniques presented herein. In particular, the storage device driver 306 includes a storage device interface component 308, which is configured to generate a storage region representation 310 of respective storage regions 304 of the respective storage devices 102. The storage device driver 306 also includes a storage controller driver component 312, which is configured to, for respective storage pools 116 comprising at least one storage region 304 of respective storage devices 102, claim the storage region representations 310 of the storage regions 304 of the storage devices 102 involved in the storage pool 116; apply a storage device relationship 302 to the storage pool 116; and generate a pooled storage region representation 314 of the storage pool 116. The storage device driver 306 also includes a storage port driver component 316, which is configured to, for respective pooled storage region representations 314, generate a logical representation 318 of the pooled storage region representation 314. In this manner, the storage device driver 306 may present the storage device 102 within the operating environment of the computer 108 in a layered and flexible manner in accordance with the techniques presented herein.

Figure 4:
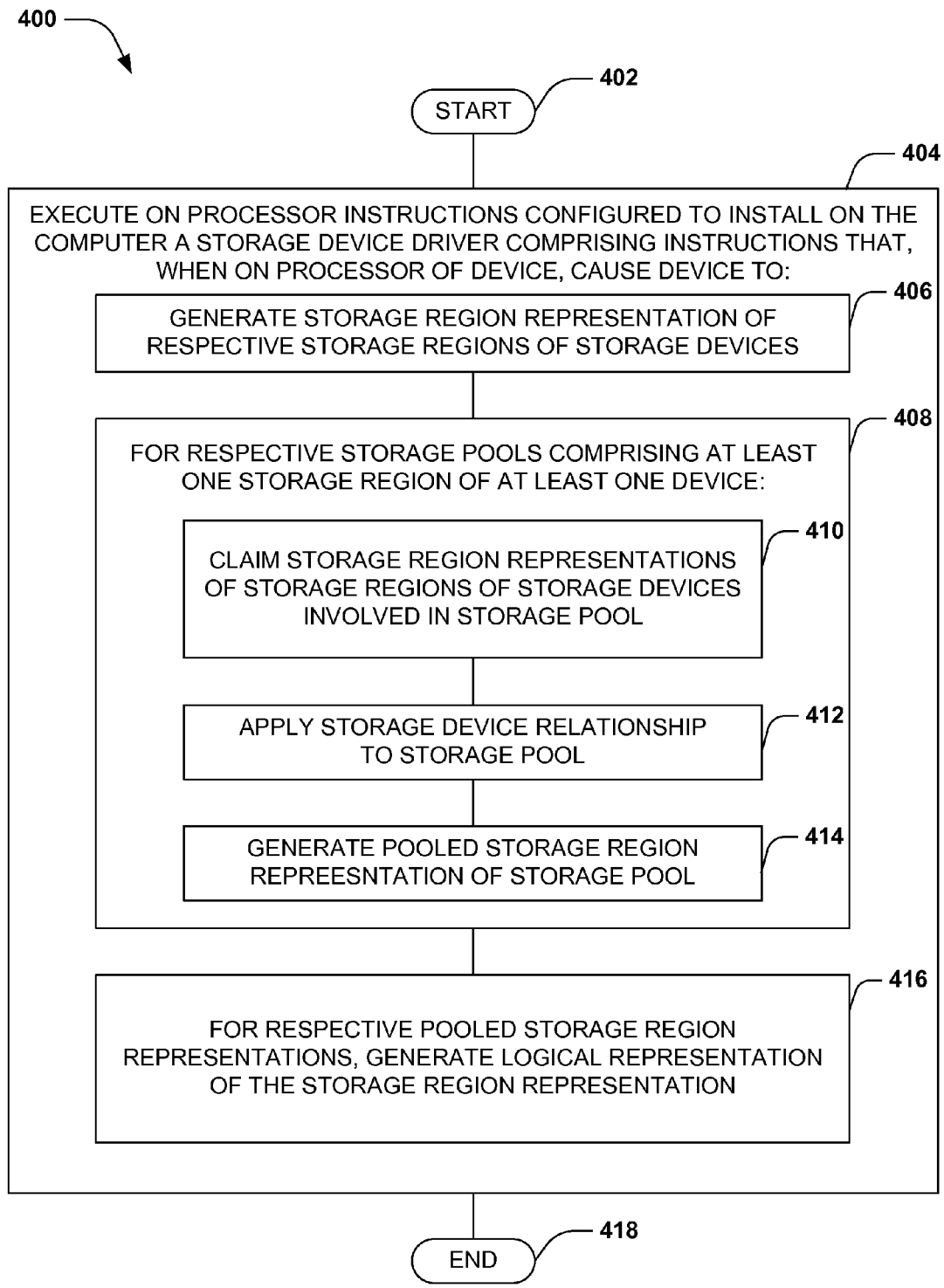
FIG. 4 is a flowchart illustrating an exemplary method of representing storage devices accessible to a device in accordance with the techniques presented herein.

FIG. 4 presents an illustration of a second embodiment of these techniques, illustrated as an exemplary method 400 of representing storage devices 102 accessible to a computer 108 having a processor. The exemplary method 400 may be implemented, e.g., as a set of instructions stored in a memory component of a computer 108 (e.g., a memory circuit, a platter of a hard disk drive, a solid-state memory component, or a magnetic or optical disc) that, when executed by a processor of the computer 108, cause the computer 108 to perform the techniques presented herein. The exemplary method 400 begins at 402 and involves executing 404 the instructions on the processor. Specifically, the instructions are configured to install on the computer 108 a storage device driver 306 that, in turn, comprises instructions configured to, when executed on the processor, cause the computer 108 to represent storage devices 102 according to the techniques presented herein. In particular, the instructions of the storage device driver 306 are configured to generate 406 a storage region representation 310 of respective storage regions 304 of the respective storage devices 102. The instructions of the storage device driver 306 are also configured to, for respective 408 storage pools 116 comprising at least one storage region 304 of at least one storage device 102, claim 410 the storage region representations 310 of the storage regions 304 of the storage devices 102 involved in the storage pool 116; apply 412 a storage device relationship 302 to the storage pool 116; and generate 414 a pooled storage region representation 314 of the storage pool 116. The instructions of the storage device driver 306 are also configured to, for respective pooled storage region representations 314, generate 416 a logical representation of the storage region representation 310. By installing on the computer 108 a storage device driver 306 configured to operate in this manner, the exemplary method 400 represents the storage devices 102 within the operating environment of the computer 108 in accordance with the techniques presented herein, and so ends at 418.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the computer to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the computer to implement the techniques presented herein.

Figure 5:
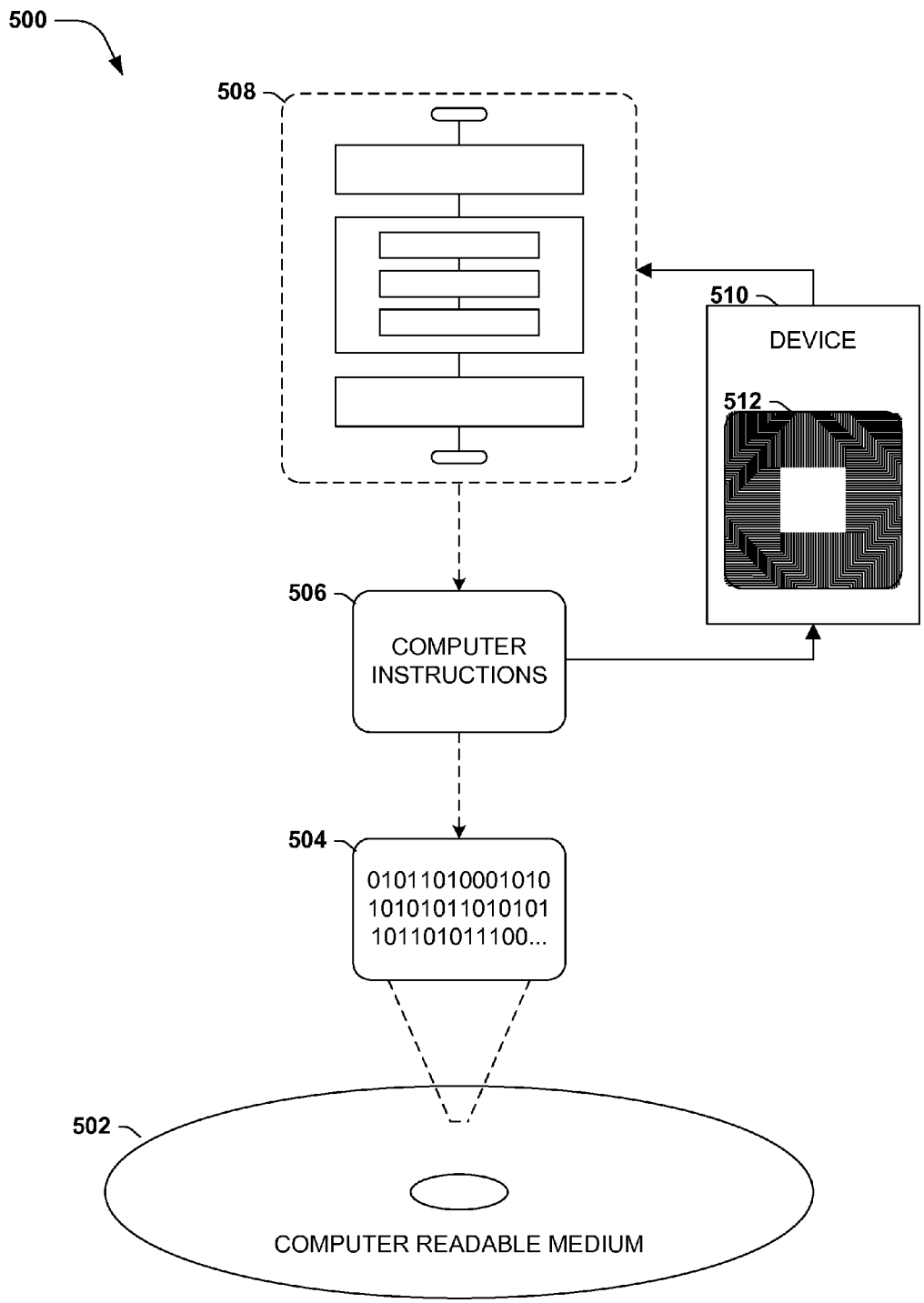
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method of representing storage devices on a computer, such as the exemplary method 400 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4) in order to confer individual and/or synergistic advantages upon such embodiments.

D1. Scenarios

A first aspect that may vary among embodiments of these techniques relates to the scenarios wherein such techniques may be utilized. As a first variation of this first aspect, these techniques may be used with many types of storage devices 102, including hard disk drives, solid-state storage devices, nonvolatile memory circuits, tape-based storage devices, and magnetic and optical discs. Such storage devices 102 may also be directly connected to a computer 108 implementing these techniques; may be accessible through a wired or wireless local area network (e.g., an 802.11 WiFi network or ad-hoc connection, or an infrared connection); and/or may be accessible through a wired or wireless wide-area network (e.g., a cellular network or the internet).

As a second variation of this first aspect, the storage devices 102 may store many types of data sets. For example, the capacity of the storage devices 102 may be used to store binary storage systems storing various types of binary objects; file systems storing files; media libraries storing media objects; object systems storing many types of objects; databases storing records; and email systems storing email messages. Additionally, such data sets may be organized in many ways, such as an unordered set, a sequence, a hierarchical structure such as a tree, or a collection of tuples.

As a third variation of this first aspect, portions or all of these techniques may be implemented within one or more components within the computing environment, such as a set of software instructions stored in a volatile or nonvolatile of a computer or device having access to the storage devices 102 (e.g., an operating system process or a hardware driver); by a storage system configured to interface with the storage devices 102 (e.g., a hardware storage controller); or in respective storage devices 102.

As a fourth variation of this first aspect, the storage devices 102 may be configured to allocate capacity in various ways. For example, the storage devices 102 may be configured to allocate capacity as a set of partitions exposing logical volumes; as a set of extents associated with spaces; or as a set of capacity slabs that may be further provisioned and associated with spaces. Those of ordinary skill in the art may devise many scenarios wherein the techniques presented herein may be utilized.

D2. Storage Device Driver

A second aspect that may vary among embodiments of these techniques relates to variations in the implementation of the storage device driver 306. As a first variation, the architecture of the storage device driver 306 may vary in many respects. The exemplary scenario 300 of FIG. 3 illustrates one suitable architecture of an exemplary storage device driver 306 comprises a storage device interface component 308 as a lower-level interface to the storage devices 102, a storage controller driver component 312 as a mid-level interface that implements the storage pool 116 and the storage device relationships 302, and storage port driver component 316 as an upper-level interface that generates the top-level representation of the storage pool 116 within the operating environment of the computer 108. However, many variations in this architecture may be devised that may nevertheless capture the techniques presented herein. As one such example, the storage controller driver component 312 may be implemented as a pooling component that aggregates storage devices 102 into a storage pool 116, and a separate storage device relationship component that implements the storage device relationships 302 of the storage pools 116 (e.g., a distinct component implemented in a layer above, below, or alongside the pooling component). Many such architectural variations may be devised while remaining compatible with the techniques presented herein.

As a second variation of this second aspect, respective components of the storage device driver 306 may generate various representations of the storage devices 102 in different contexts, and may do so in many ways. As a first example, one or more components may generate a representation of the storage devices that is visible within the operating environment of the computer 108. Alternatively, a component may generate a representation that is internal to the storage device driver 36, and may expose the representation only to a higher-level component for consumption thereby. For example, the storage controller driver component 312 may generate a pooled storage region representation 314 that is visible to other processes of the computer 108, or may present the pooled storage region representation 314 only to the storage port driver component 316 for further representation as a logical representation 318. As a second example, respective components may claim a representation of the storage devices 102 generated by a lower-level component. For example, for respective storage region representations 310 generated by the storage device interface component 308 for storage regions 304 that are involved in a storage pool 116, the storage controller driver component 312 may claim such storage region representations 310 by completely consuming and hiding them from other processes of the operating environment of the computer 108 (e.g., entirely removing storage devices 102 hosting such storage regions 304 from a storage device enumeration), such that the storage regions 304 are not visibly represented and do not appear to exist. Alternatively, the storage controller driver component 312 may simply alter the storage region representations 310, e.g., simply changing the inclusion of the storage devices 102 in the storage device enumeration to a specialized storage device type, or replacing the representation with the pooled storage region representation to the storage device enumeration, thereby allowing such representations to remain visible but marked as reserved for inclusion in the pooled storage region representation 314. As another alternative, the storage controller driver component 312 may claim the storage region representations in a nonexclusive manner, e.g., by associating the pooled storage region representation 314 with the underlying storage region representations 310, but may allow other processes to interact with a storage region representations 310 in a similar manner as those of unspooled storage regions 304. Those of ordinary skill in the art may devise many variations in the architecture and operation of the storage device driver 306 while implementing the techniques presented herein.

D3. Simple Clustering

A third aspect that may vary among embodiments of these techniques relates to the adaptation of the techniques presented herein (e.g., the configuration of the storage device driver 306) for simple clustering scenarios. For example, the computer 108 within which the storage device driver 306 represents the storage devices 102 may be included as a node 208 in a simple cluster 206, wherein respective nodes 208 may have access to a set of storage devices 102 (including those attached to this computer 108, to other nodes 208, and/or accessible over a network). In a simple cluster 206, respective nodes 208 may request exclusive access among the nodes 208 to a storage pool 116 accessible to the storage devices 102. For example, the storage pool 116 may only be accessible to one node 208 of the cluster 206 at a time, and the nodes 208 may negotiate access through various concurrency mechanisms. In particular, the node may be configured to select a storage pool owner having exclusive access to a storage pool 116, who may remain the storage pool owner until relinquishing ownership of the storage pool 116 and/or until ownership is revoked by the cluster 206. For example, the nodes 208 of the cluster 206 may detect various substitution events that may compel the selection of a substitute pool owner (e.g., a load rebalancing event indicating a rebalancing from a first node 208 of the cluster 206 to a second node 208 of the cluster 206; a disconnection event, indicating a disconnection of the storage pool owner from the cluster 206; and a failure event indicating the failure of a node 208, such as a failure of the storage pool owner). In such events, the other nodes 208 of the cluster 206 may automatically choose a new storage pool owner of the storage pool 116 among the remaining available nodes 208 of the cluster 206 (or may simply revoke ownership of the storage pool 116 until and unless claimed by another node 208).

The storage device driver 306 may be configured to support the inclusion of the computer 108 as a node 208 in a simple cluster 206 scenario. As a first example, if the computer 108 is selected as a storage pool owner of a storage pool 116, the storage device driver 306 may indicate that the storage pool is accessible to the computer 108 as a node 208 of the cluster 206 (e.g., by automatically generating the pooled storage region representation 314 and/or logical representation 318 of the storage pool 116, and/or by automatically mounting the storage pool 116 as a logical disk upon detecting the designation of the computer 108 as the storage pool owner). As a second example, if another node 208 is selected as the storage pool owner, or if ownership is revoked from the computer 108, the storage device driver 306 may indicate that the storage pool 116 is inaccessible to the computer 108 (e.g., by automatically unmounting the storage pool 116 as a logical disk, and/or by automatically withdrawing the logical representation 318 and/or the pooled storage region representation 314 arising from the storage pool 116).

In a further variation of this third aspect, the nodes 208 of the cluster 206 may be configured to distinguish between storage pools 116 having a redundancy plan (e.g., storage pools 116 including a storage feature 204 such as mirroring or parity calculations), and may select storage pool owners only for such storage pools 116, while allowing any node 208 of the cluster 206 to access storage pools 116 not having a redundancy plan. This differentiation of storage pools 116 may reflect the significant and potentially catastrophic effects of granting concurrent access by multiple nodes 208 to a storage pool 116 having such a redundancy plan; e.g., if two nodes 208 write to portions of a storage pool 116 that result in a mismatch of the checksum with the corresponding data sets, the integrity of completely unrelated data sets may be compromised, and, indeed, the integrity of the entire storage pool 116 may be jeopardized. By contrast, storage pools 116 that do not feature a redundancy plan may not be compromised by write conflicts; e.g., the validity of a written data set may be impaired by a write conflict, but is unlikely to jeopardize the integrity of the entire storage pool 116. Therefore, the storage device driver 306 may be configured to recognize and enforce access exclusively through the designation of a storage pool owner for storage pools 116 having a redundancy scheme, but may not apply such rigorous restrictions to other storage pools 116. Those of ordinary skill in the art may devise many variations in the configuration of the storage device driver 306 to support simple clustering scenarios in accordance with the techniques presented herein.

D4. High-Availability Clustering

A fourth aspect that may vary among embodiments of these techniques relates to the representation by the storage device driver 306 of storage devices 102 on a computer 108 that is included as a node 208 of a high-availability cluster 206. By contrast with simple clustering scenarios, a high-availability cluster 206 may present a tighter degree of interoperation among the nodes 208. For example, such clusters 206 may include more sophisticated mechanisms for sharing storage pools 116, and for sharing pool resources (e.g., groups of storage devices 102 and/or storage regions 304); and more sophisticated mechanisms for providing and protecting access to respective storage devices 102, storage regions 304, and storage pools 116. By integrating with the complexities of the storage scenario in a comprehensive manner (e.g., by encapsulating the storage devices 102, storage regions 304, storage pools 116, storage device relationships 302, storage features 204, and logical representations 318, as well as the enrollment of the computer 108 as a node 208 of a high-availability cluster 206), the storage device driver 306 may be capable of implementing such access controls and other features of the high-availability cluster 206.

As a first variation of this fourth aspect, the storage device driver 306 may be configured to recognize the designation of a node 208 of the cluster 206 (including the computer 108 on which the storage device driver 306 is installed) as a storage pool manager of a storage pool 116. In high-availability clusters 206, a storage pool 116 may include a storage pool configuration, which may be stored on respective storage devices 102 participating in the storage pool 116. For example, the storage pool configuration may indicate the logical representations 318 arising from the storage pool 116; the provisioning and allocation of the storage regions 304 of the storage devices 102 that manifest storage pool 116; and the details of storage features 204 (e.g., the calculation of parity values using a particular parity algorithm). The storage pool configuration may be updated infrequently, but such changes may represent a significant modification of the storage devices 102. Accordingly, it may be advantageous to ensure that such changes are written only by one node 208, and are promptly broadcast from that node 208 to all other nodes 208 of the cluster 206 (e.g., rather than disseminating such information in a decentralized manner). Therefore, it may be advantageous for the cluster 206 to select a node 208 as a storage pool manager that has exclusive write access to the storage pool configuration on respective storage devices 102. Other nodes 208 that seek to change the storage pool configuration (e.g., initiating the creation of a new logical representation 318 within the storage pool 116) may be prohibited from directly updating the storage pool configuration, and may instead forward such requests to the storage pool manager of the storage pool 116 within the cluster 206. Additionally, the storage pool manager may be configured to broadcast an update to the other nodes 208 of the cluster 206 upon updating the storage pool configuration, prompting the other nodes 208 to re-read the storage pool configuration in order to promote correct access to the storage devices 102 and storage regions 304 comprising the storage pool 116.

In such circumstances, the storage device driver 306 may be configured to participate in and/or be informed of this selection, and may accordingly enforce the access to the storage pool configuration on the respective storage devices 102. As a first example, the storage device driver 306 may detect that the nodes 208 of the cluster 206 are configured to select a storage pool manager that is configured (predominantly or exclusively) to update the storage pool configuration. If the computer 108 on which the storage device driver 306 is installed is selected as the storage pool manager, the storage device driver 306 may enable the computer 108 to access the storage pool configuration of respective storage devices 102 and storage pools 116. However, if the computer 108 is not the storage pool manager, the storage device driver 306 may prohibit such accesses, and/or may automatically forward such accesses to the current storage pool manager. Indeed, in some embodiments, the storage device driver 306 may even participate in the selection of the storage pool manager among the nodes 208 of the cluster 206 (possibly by communicating with the storage device drivers 306 installed on the other nodes 208 of the cluster 206), and/or in the dissemination of information about updates to the storage pool configuration (e.g., upon the computer 108 updating the storage pool configuration of the storage pool 116, the storage device driver 306 may invoke a broadcast interface of the cluster 206 to notify the other nodes 208 of the cluster 206 of the update to the storage pool configuration).

Figure 6:
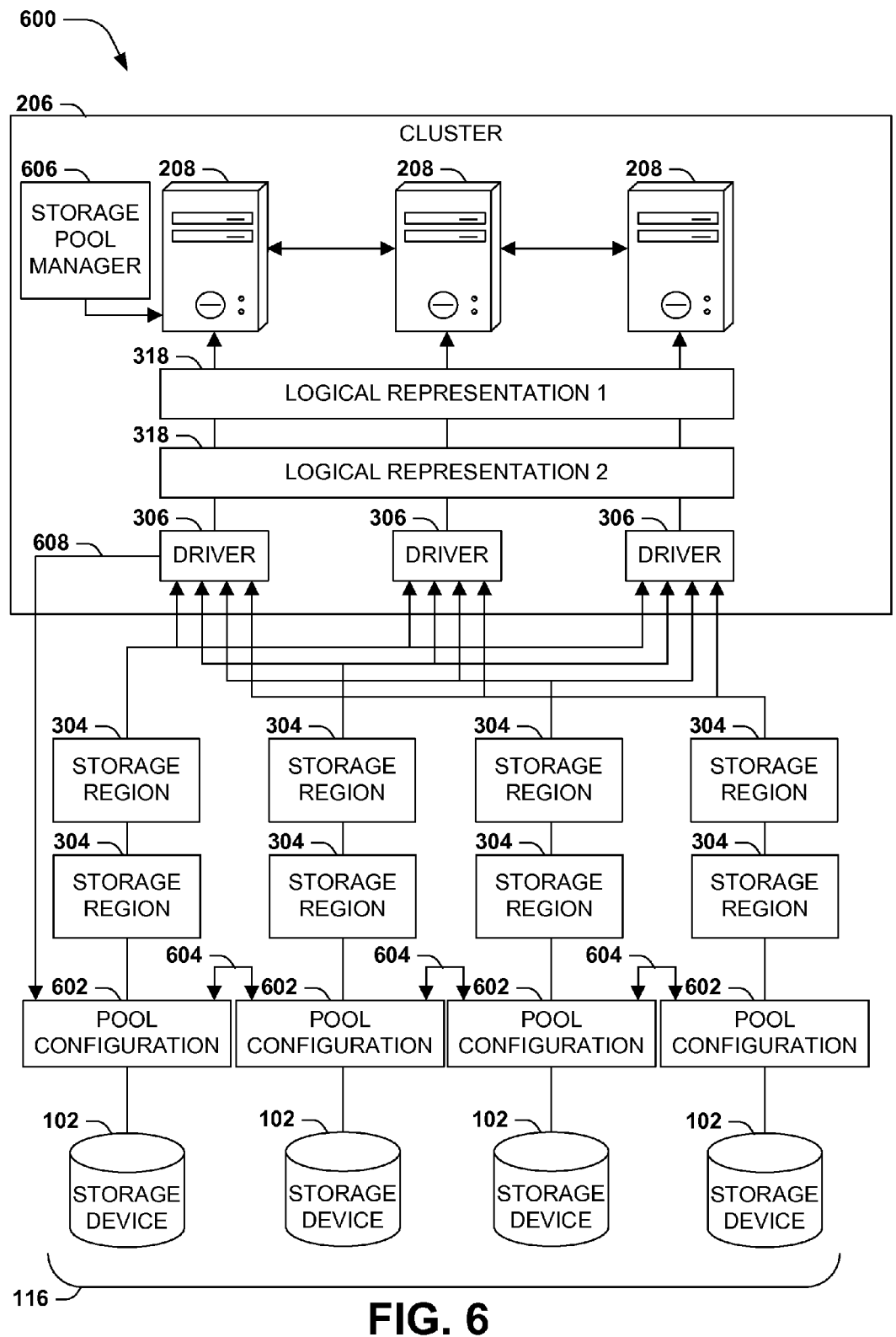
FIG. 6 is an illustration of an exemplary scenario featuring a representation of storage regions of respective storage devices to the nodes of a cluster in accordance with the techniques presented herein.

FIG. 6 presents an illustration of an exemplary scenario 600 featuring a high-availability cluster 206 comprising a set of nodes 208 having access to a storage pool 116 of storage devices 102. In this exemplary scenario 600, respective storage devices 102 may comprise a set of storage regions 304 that are allocated to a storage pool 116 accessible to the nodes 208 of the cluster 206, and from which a set of logical representations 318 may be exposed. In particular, respective nodes 208 of the cluster 206 may comprise a storage device driver 306 configured according to the techniques presented herein, which may achieve the generation, within the operating environments of the respective nodes 208, of the logical representations 318 of the storage regions 304 comprising the storage pool 116. Moreover, respective storage devices 102 may store a storage pool configuration 602 containing configuration and maintenance information about the storage pool 116. The storage devices 102 may automatically synchronize 604 the storage pool configurations 602 stored on the storage devices 102 in order to maintain consistency and synchrony in the representation of the storage pool 116.

In the exemplary scenario 600 of FIG. 6, the storage device drivers 306 operating on each node 208 of the cluster 206 may facilitate the cluster 206 in various ways. For example, rather than enabling any of the nodes 208 of the cluster 206 to access the storage pool configuration 602 on any storage device 102, the storage device drivers 306 may initiate, participate in, and/or monitor the selection, among the nodes 208 of the cluster 206, of a storage pool manager 606 that is granted exclusive write access to the storage pool configuration 602. The storage device drivers 306 may permit an update of the storage pool configuration 602 to be initiated by the storage pool manager 606, and/or forward to the storage pool manager 606 for initiation, and may permit the storage pool manager 606 to update 608 the storage pool configuration 602 of a storage device 102. Upon receiving the update, the storage devices 102 may be automatically synchronize 604 the storage pool configurations 602 to propagate to the other storage devices 102. Alternatively, the storage pool manager 606 and/or the storage device drivers 306 may synchronize 604 the storage pool configurations 602. Additionally, each storage device drivers 306 may prohibit the node 208 upon which it is installed to update 608 the storage pool configuration 602 if it is not the storage pool manager 606 of the storage pool 116. In this manner, the storage device drivers 306 facilitate the operation of the high-availability cluster 206.

As a further example of this first variation of this fourth aspect, the storage device drivers 306 may toggle exclusive access to the storage pool configuration 602 of a storage device 102 in view of whether the storage device 102 is currently claimed by a cluster 206. It may be appreciated that if the storage device 102 is not utilized by a cluster 206 and/or a storage pool 116, then it may be permissible to enable any computer 108 to update the storage pool configuration 602 (since it may not be heavily relied upon by other nodes 208 of a cluster 206). In one such scenario, the storage pool configuration 62 of respective storage pools 116 may comprise a clustering participation indicator, such as a particular bit or value that indicates whether a cluster 206 has claimed the storage pool 116. The storage device driver 306 may be configured to set the clustering participation indicator of the storage pool configuration 602 of the storage pool 106 upon detecting that the storage pool 116 has joined a cluster 206, and to clear the clustering participation indicator of the storage pool configuration 602 of the storage pool 106 upon detecting that the storage pool 116 has left a cluster 206. Moreover, upon receiving a request to update the storage pool configuration 602 of a storage pool 106, the storage device driver 306 may determine whether the clustering participation indicator of the storage pool configuration 606 of the storage pool 116 is set. If so, the storage device driver 306 may refrain from and the computer is not the storage pool manager of the storage pool 116, prohibit updates 608 to the storage pool configuration 606 of the storage pool 116 unless the computer 108 has been selected as the storage pool manager 604 of the storage pool 116. For example, the storage device driver 306 may toggle the representation of the storage pool configuration 602 on the node 208 between a read/write state and a read-only state based on whether the storage device 102 is participating in the cluster 206, and whether the node 208 has been selected as the storage pool manager 604 of the storage pool 116.

As a second variation of this fourth aspect, the storage device driver 306 may promote the claiming of storage pools 116 and storage devices 102 by a cluster 206 in which the computer 108 on which the storage device driver 306 is installed is enrolled as a node 208. In such scenarios, it may be advantageous to restrict access to a storage device 102 to the nodes of a cluster 206; e.g., concurrent access to a storage device 102 may be achieved and/or facilitated by dependable communication among the nodes 208 of the cluster 206 accessing the storage device 102. Therefore, respective storage devices 102 may comprise a registration list, where registrations of computers 108 that are permitted to access the storage device 102 may be recorded, and such registrations may specify that respective computers 108 are authorized to write to storage regions 304 involved in a storage pool 116 of the cluster 206. The storage device 102 may be configured to enforce this permission by accepting write requests (and, optionally, also read requests and/or other access requests) only from computers 108 included in the registration list. Therefore, when a node 208 of the cluster 206 initiates an access of a storage device 102, the node 208 may first access the registration list stored on the storage device 102, and may add itself to the registration list. Additionally, a node 208 of the cluster 206 may be selected as a storage device manager of the storage device 102, and may monitor the registration list (e.g., through frequent polling or a publication/subscription notification system) to ensure that only nodes 208 enrolled in the cluster 206 are included in the registration list. If the storage device manager identifies a registration on the registration list of a computer 108 that is not enrolled as a node 208 of the cluster 206 (e.g., a node 208 that has been disconnected or evicted from the cluster 206), the storage device manager may remove registrations from the registration list for the computer 108. The storage device manager may be selected in many ways, e.g., through election or self-selection; alternatively, the storage pool manager 602 of the cluster 206 may also operate as the storage device manager of the storage devices 102 utilized by the cluster 206. Moreover, the storage device 104 may promote the maintenance of the registration list by including a reservation for the node 208 selected as the storage device manager, and allowing only the node 208 having the reservation to update the registration list. The storage device drivers 306 may participate in this protection mechanism of the storage devices 102 in various ways, e.g., by automatically requesting a registration when the computer 108 accesses a storage device 102; by initiating, participating in, and/or monitoring the selection of the storage device manager; and/or by prohibiting the computer 108 from accessing storage devices 102 for which the computer 108 does not have a registration.

Figure 7:
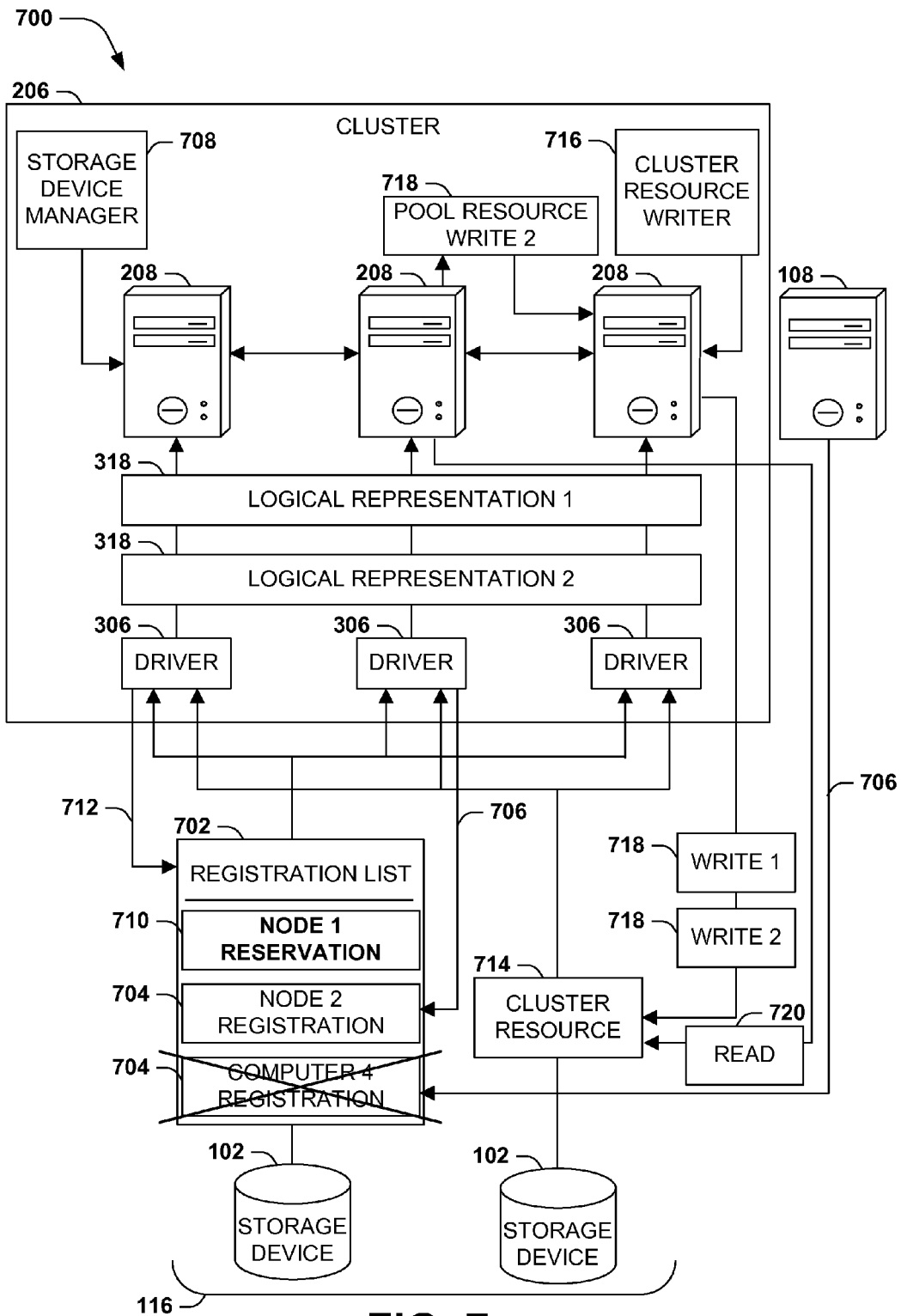
FIG. 7 is an illustration of another exemplary scenario featuring a representation of storage regions of respective storage devices to the nodes of a cluster in accordance with the techniques presented herein.

FIG. 7 presents an illustration of an exemplary scenario 700 featuring the protection of a storage device 102 through the implementation of a registration list 702. In this exemplary scenario 700, a cluster 206 of nodes 208, each having installed a storage device driver 306 configured according to the techniques presented herein, accesses a storage device 102 from which a set of logical representations 318 may be generated by the storage device drivers 306. In particular, the storage device 102 participating in a storage pool 116 may be reserved for access only by the nodes 208 of the cluster 206, and to refuse access to computers 108 that are not currently enrolled in the cluster 206. Accordingly, the storage device 102 may include a registration list 702 comprising registrations 704 indicating an authorization for the node 208 to access the storage device 102. A node 208 may create 706 a registration 704 for itself by simply updating the registration list 702. However, the storage device 102 may also be accessible to computers 108 outside of the cluster 206, e.g., a computer 108 that has been disconnected or evicted from the cluster 206. Moreover, the computer 108 may not even detect the disconnection or eviction, and therefore may be unable to determine that it is no longer safe to access the storage device 102. Therefore, a node 208 of the cluster 206 (e.g., the storage pool manager 606) may be selected as a storage device manager 708 for the storage device 102. This selection may be indicated by adding a reservation 710 to the registration list 702 identifying the node 208 selected as the storage device manager 708. The storage device manager 708 may poll 712 the registration list 702, and may compare the nodes 208 having registrations 704 on the storage device 102 with the list of nodes 208 currently enrolled in the cluster 206. If the storage device manager 708 identifies a computer 108 having a registration 704 but that is not currently a node 208 of the cluster 206, the storage device manager 708 may remove the registration 704 of the computer 108 from the registration list 702, as depicted by the "X" of the registration of the fourth computer 704 in the exemplary scenario 700 of FIG. 7. Subsequent attempts by the computer 108 to write to the storage device 102 may thereafter be automatically denied by the storage device 102 due to the absence of a registration 704 for the computer 108. In this manner, the storage devices 102 may utilize registration lists 702 to limit access only by the current nodes 208 of the cluster 206.

Registration lists 702 may also present additional uses to the cluster 206, e.g., as a sharing mechanism to negotiate access to a storage pool 116 represented on the storage devices 102. As one example, the registration lists 702 may enable high-availability clusters 206 to avoid similar problems encountered by as simple clusters 206 with respect to concurrent access to storage pools 116 having redundancy plans, wherein granting concurrent access by multiple nodes 208 to a storage pool 116 having a redundancy plan may have significant and potentially catastrophic effects. For example, if two nodes 208 write to portions of a storage pool 116 that result in a mismatch of the checksum with the corresponding data sets, the integrity of completely unrelated data sets may be compromised, and, indeed, the integrity of the entire storage pool 116 may be jeopardized. In order to avoid such concurrent access problems, respective nodes 208 (including the storage device drivers 306 installed thereupon) may, upon receiving a request from a computer 108 to access a storage pool 116 having a redundancy plan, read the registration list 702 of the storage device 102; for the nodes 208 having a registration 704 on the registration list 702, request the other nodes 208 to unmount the storage pool 116, and may access the storage pool 116 of the storage device 102 after receiving an unmount confirmation from all of the other nodes 208. Similarly, respective computers 108 (including the storage device drivers 306 installed thereon) may be configured to, upon receiving from a node 208 a request to unmount a storage pool 116, unmount the storage pool 116 (if it is currently mounted), and send an unmount confirmation to the node 208. The registration list 702 may therefore promote the sharing of storage pools 116 and storage devices 102 among the nodes 208 of the cluster 206 while avoiding some problems of concurrent access to storage pools 116 having redundancy plans.

As a fourth variation of this fourth aspect, the cluster 206 may comprise various cluster resources (e.g., one or more logical representations 318) that may be reserved for access by a particular node 208. For example, a node 208 may be delegated to provide a particular service of the cluster 206 (e.g., a load balancing server), and in order to fulfill this role, the node 208 may be permitted to access a cluster resource, such as a logical volume where the identities and workloads of respective nodes 208 of the cluster 206 are recorded, or where load-balancing determinations are logged. In such scenarios, the cluster 206 may provide various types of access to the selected node 208. As a first example, the node 208 may be selected as a cluster resource owner, and may be granted exclusive read and write access to the cluster resource, while other nodes 208 may be prohibited from accessing the cluster resource in any way. As a second example, the node 208 may be selected as a cluster resource writer, and may be granted exclusive read and write access to the cluster resource, while other nodes 208 are granted read-only access to the cluster resource (and may forward requests for writes tot eh node 208 selected as the cluster resource writer). The storage device drivers 306 may initiate, participate in, and/or monitor the selection of the cluster resource owners and/or cluster resource writers of respective cluster resources, and may enforce such selections on the node 208 on which each storage device driver 306 is installed. Additionally, upon detecting a substitution event (e.g., a failure, a disconnected, or a load-balancing determination) involving a node 208 of the cluster 206 selected as a cluster resource owner and/or cluster resource writer, the storage device drivers 306 may initiate a selection of a substitute cluster resource owner and/or a substitute cluster resource writer of the cluster resource. This mechanism may be particularly utilized to regulate access to the storage pool configuration 602 of a storage pool 116 through the selection of a cluster resource writer (e.g., storage pool manager 606) having exclusive write access to the cluster resource (e.g., the storage pool configuration 602), while granting read access to the other nodes 208 of the cluster 206.

FIG. 7 presents an illustration of an exemplary scenario featuring the regulation of access to a cluster resource 714 in accordance with these techniques. In this exemplary scenario 700, a cluster resource 714 is provided by a storage device 102 in order to facilitate the services provided by the nodes 208 of the cluster 206. Among the nodes 208 of the cluster 206, a particular node 208 may be selected as a cluster resource writer 716, and may be granted exclusive write access to the cluster resource 714. The cluster resource writer 716 may therefore send write requests 718 directly to the cluster resource 714 for commitment to the storage device 102. Other nodes 208 of the cluster 206 may send read requests 720 directly to the cluster resource 714, but may be directed to forward write requests 718 involving the cluster resource 714 to the node 208 selected as the cluster resource writer 716, which may determine whether or not to apply the write requests 718 to the cluster resource 714. These access restrictions to the cluster resource 714 may be enforced, e.g., by the storage device 102 and/or the storage device drivers 306 stored on the respective nodes 208 of the cluster 206.

A particular type of cluster resource 714 that may be accessed in this manner is a maintenance region, wherein metadata regarding various storage regions 304 involved in the cluster 206 may be recorded. For example, the maintenance region may record the health of storage pools 116 having a redundancy plan; e.g., when a storage device 102 or storage region 304 fails, a node 208 of the cluster 206 may, while performing a repair of the storage pool 116, record health information about the health of the storage pool 116 in the maintenance region. The maintenance region may also include information about the availability of respective storage devices 102 (e.g., whether a storage device 102 is temporarily or permanently detached) and dirty region information (e.g., redundant data sets of a storage region 304 that are to be synchronized, such as checksums to be updated).

The maintenance region may be used to facilitate the repair of a storage region 304 that has experienced a failure, such as a detachment, data corruption, or damage to the storage device 102 storing the storage region 304. A node 208 of the cluster 206 (particularly a node 208 designated as the cluster resource writer 716 for the maintenance region) may be configured to update the maintenance region to record detected health updates. If the health update prompts a repair operation for the storage region 304, the cluster resource writer 716 may (optionally) first wait for a brief waiting period to determine whether the storage region 304 is restored (e.g., the health update may comprise a "detached" indicator that is caused by a temporary network disconnection). However, either promptly upon detecting the health update or after the waiting period expires, the cluster resource writer 716 may determine that the storage region 304 has failed, and may initiate a repair operation. Some repair operations may be completed by rewriting or reconstructing the data in the storage region 304, e.g., to repair data corruption caused by a race condition through the use of resilient data stored elsewhere in the storage set. However, other repairs may involve discarding a storage region 304 and/or a storage device 102 that has irrevocably failed and reallocating space for a corresponding storage pool 116, which may have to involve the storage pool manager 606 to perform the reallocation. Therefore, the cluster resource writer 716 may directly notify the storage pool manager 606 of the health update of the storage region 304 and the invocation of the repair operation. Alternatively, the cluster resource writer 716 may simply update the maintenance region with the health update, and the storage pool manager 606 may monitor the maintenance region in order to detect health updates that may prompt a reconfiguration of the storage pool configuration 602. In either scenario, the cluster resource writer 716 may be unable to revoke the initiation of the repair operation (since the storage pool manager 606 may already have marked the damaged storage region 304 as unusable and/or allocated new capacity for the storage region 304). Additionally, the cluster resource writer 716 may be unable to take further action in the repair operation until capacity is allocated.

Upon receiving the notification and/or detecting the health update of the maintenance region prompting the repair operation, the storage pool manager 606 may allocate a new storage region 304, and may update the storage pool configuration 602 to reflect the allocation. The storage pool manager 606 may then notify the cluster resource writer 716 that new capacity has been allocated. This notification may be explicit and direct (e.g., the storage pool manager 606 may directly contact the cluster resource writer 716 to indicate the capacity allocation), or may be implicit (e.g., a notification of the update of the storage pool configuration 602 may be automatically propagated to the other nodes 208 of the cluster 206, and the cluster resource writer 716 for the maintenance region may detect the allocation of the substitute storage region 304 in the update of the storage pool configuration 602). In either scenario, upon receiving the notification that new capacity has been allocated, the cluster resource writer 716 may initiate the reconstruction of the data into the substitute storage region 304 in order to repair the storage region 304. In this manner, the storage pool manager 606 and the cluster resource writer 716 for the maintenance region may implicitly collaborate to achieve the repair of the storage region 304. Those of ordinary skill in the art may devise many adaptations for use with high-availability clusters 206 of the techniques presented herein.

E. Computing Environment

Figure 8:
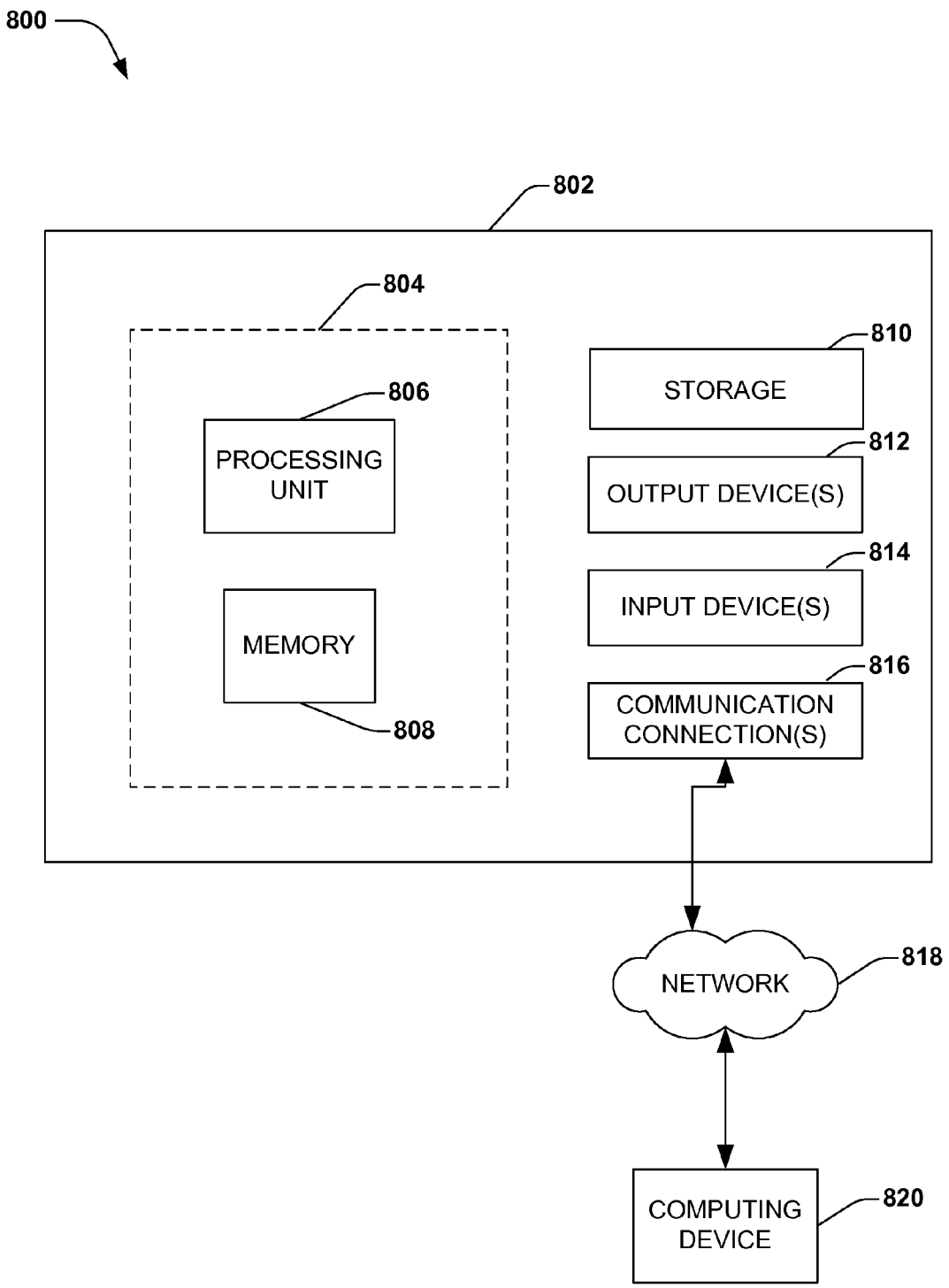
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer readable instructions to implement one or more embodiments provided herein may be in storage 810. Storage 810 may also store other computer readable instructions to implement an operating system, an application program, and the like. Computer readable instructions may be loaded in memory 808 for execution by processing unit 806, for example.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media may be part of device 802.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer readable instructions may be distributed across a network. For example, a computing device 820 accessible via network 818 may store computer readable instructions to implement one or more embodiments provided herein. Computing device 802 may access computing device 820 and download a part or all of the computer readable instructions for execution. Alternatively, computing device 802 may download pieces of the computer readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module", "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A memory device not comprising an electromagnetic signal, the memory device storing instructions that, when executed on a processor of a computer, cause the computer to provide a storage device driver comprising:
   a storage device interface component configured to generate a storage region representation of respective storage regions of storage devices;
   a storage controller driver component configured to, for respective storage pools comprising at least one storage region of at least one storage device:
      claim the storage region representations of the storage regions of the storage devices involved in the storage pool;
      apply a storage device relationship to the storage pool; and
      generate a pooled storage region representation of the storage pool; and
   a storage port driver component configured to, for respective pooled storage region representations, generate a logical representation of the pooled storage region representation.

2. The memory device of claim 1:
   respective storage pools represented on respective storage devices as a storage pool configuration;
   the computer included in a cluster comprising nodes having access to the storage devices comprising a storage pool;
   for respective storage pools, a storage pool manager having been selected among the nodes of the cluster; and
   the storage controller driver component configured to:
      upon receiving a request to access a storage device, access the storage device through the storage device interface component; and
      upon receiving a request to update a storage pool configuration for a storage device:
         determine whether the node is the storage pool manager of the storage pool including the node;
         upon determining that the node is not the storage pool manager, forward the request to the storage pool manager; and
         upon determining that the node is the storage pool manager, update the storage pool configuration through the storage device interface component for the storage device.

3. A method of representing storage devices accessible to a computer having a processor and a memory, the method comprising:
   storing in the memory of the computer a storage device driver comprising instructions that, when executed on the processor, cause the computer to:
      generate a storage region representation of respective storage regions of storage devices;

for respective storage pools comprising at least one storage region of at least one storage device:
    claim the storage region representations of the storage regions of the storage devices involved in the storage pool;
    apply a storage device relationship to the storage pool; and
    generate a pooled storage region representation of the storage pool; and
for respective pooled storage region representations, generate a logical representation of the storage region representation.

4. The method of claim 3:
the computer configured to present a storage device enumeration of storage devices accessible to the computer;
claiming the storage device representations of storage devices involved in a storage pool comprising: removing the storage device from the storage device enumeration; and
generating the storage region representation of a storage pool comprising: adding the pooled storage region representation to the storage device enumeration.

5. The method of claim 3:
the computer included in a cluster comprising nodes having access to the storage devices comprising a storage pool; and
the instructions configured to, for respective storage pools:
    among the nodes of the cluster, select a storage pool owner having exclusive access to the storage pool;
    upon detecting a substitution event involving the storage pool owner, among available nodes of the cluster, select a substitute storage pool owner;
    upon the node being selected as the storage pool owner, indicate the storage pool as accessible to the node;
    upon another node being selected as the storage pool owner, indicate the storage pool as inaccessible to the node.

6. The method of claim 5, selecting the storage pool owner comprising: for respective storage pools having a redundancy plan, selecting a storage pool owner having exclusive access to the storage pool.

7. The method of claim 5, the substitution event selected from a substitution event set comprising:
a load rebalancing event indicating a rebalancing from a first node of the cluster to a second node of the cluster;
a disconnection event indicating a disconnection of a node from the cluster; and
a failure event indicating a failure of a node.

8. The method of claim 3:
respective storage pools represented on respective storage devices as a storage pool configuration;
the computer included in a cluster comprising nodes having access to the storage devices comprising a storage pool; and
the instructions configured to, for respective storage pools:
    among the nodes of the cluster, select a storage pool manager configured to update the storage pool configuration; and
    upon detecting a substitution event involving the storage pool manager, among available nodes of the cluster, select a substitute storage pool manager.

9. The method of claim 8, the substitution event selected from a substitution event set comprising:
a load rebalancing event indicating a rebalancing from a first node of the cluster to a second node of the cluster;
a disconnection event indicating a disconnection of a node from the cluster; and
a failure event indicating a failure of a node.

10. The method of claim 8, the instructions configured to, upon receiving a request to update a storage pool configuration for a storage device:
determine whether the node is the storage pool manager of the storage pool including the node;
upon determining that the node is not the storage pool manager, forward the request to the storage pool manager; and
upon determining that the node is the storage pool manager, update the storage pool configuration on the storage device.

11. The method of claim 10:
the cluster comprising a broadcast interface to broadcast updates to the cluster; and
the instructions configured to, upon updating a storage pool configuration on a storage device, invoke the broadcast interface to notify other nodes of the cluster of the update to the storage pool configuration.

12. The method of claim 8, the instructions configured to, upon receiving a notification of an update to the storage pool configuration, read the storage pool configuration.

13. The method of claim 8:
the storage pool configuration of respective storage pools comprising a clustering participation indicator; and
the instructions configured to:
    upon a storage pool joining a cluster, set the clustering participation indicator of the storage pool configuration of the storage pool;
    upon a storage pool leaving a cluster, clear the clustering participation indicator of the storage pool configuration of the storage pool; and
    upon receiving a request to update the storage pool configuration of a storage pool, if the clustering participation indicator of the storage pool is set and the computer is not the storage pool manager of the storage pool, prohibit updating the storage pool configuration of the storage pool.

14. The method of claim 8:
respective storage devices of the storage pool comprising a registration list comprising at least zero registrations specifying a node that is authorized to write to the storage regions of the storage pool on the storage device; and
the instructions configured to, before writing to a storage device storing at least one storage region of the storage pool, add the node to the registration list of the storage device.

15. The method of claim 14, the instructions configured to:
for respective storage devices storing at least one storage region, among the nodes of the cluster, select a storage device manager configured to manage the registration list of the storage device; and
upon determining that the computer is the storage device manager of a storage device:
    add a reservation to the registration list identifying the node of the cluster selected as the storage device manager of the storage device;
    monitor the registration list of the storage device; and
    upon detecting in the registration list a registration of a computer that is not a node of the cluster, remove the registration of the computer from the registration list.

16. The method of claim 15, the storage device manager comprising the storage pool manager of the storage pool.

17. The method of claim 14, the instructions configured to, upon receiving a request to access a storage region:

determine whether the storage region comprises a redundancy plan; and upon determining that the storage region comprises a redundancy plan:
    read the registration lists of the storage devices;
    for respective other nodes having a registration on the registration list, request the other node to unmount the storage region; and
    upon receiving from the other nodes an unmount confirmation, access the storage region of the storage device; and upon receiving from a node a request to unmount a storage region:
    if the storage region is mounted, unmount the storage region; and
    send an unmount confirmation to the node.

18. The method of claim 8:

at least one storage pool comprising at least one cluster resource; and the instructions configured to:
    for respective cluster resources, among the nodes of the cluster, select a cluster resource owner having exclusive read and write access to the cluster resource; and
    upon detecting a substitution event involving a node of the cluster:
        identify the cluster resources for which the node comprised the cluster resource owner; and
        among available nodes of the cluster, for respective cluster resources, select a substitute cluster resource owner.

19. The method of claim 8:

at least one storage pool comprising at least one cluster resource; and the instructions configured to:
    for respective cluster resources, among the nodes of the cluster, select a cluster resource writer having exclusive write access to the cluster resource; and
    upon detecting a substitution event involving a node of the cluster:
        identify the cluster resources for which the node comprised the cluster resource writer; and
        among available nodes of the cluster, for respective cluster resources, select a substitute cluster resource writer.

20. The method of claim 19, the cluster resources selected from a cluster resource set comprising:

at least one logical representation manifested from the storage pool, and the storage pool configuration for the storage pool.

21. The method of claim 19:

respective storage regions of respective storage devices having a maintenance region configured to store health information about the storage region; and the instructions configured to, upon detecting a health update of a storage region, update the maintenance region to record the health update.

22. The method of claim 21, the instructions configured to, if the computer is the storage pool manager of the storage pool:

read the maintenance region to identify storage regions to be reallocated in response to a health update;

reallocate the storage regions; and update the storage pool configuration.

23. The method of claim 22, the instructions configured to, upon detecting an update of the storage pool configuration comprising an allocation of at least one reallocated storage region, if the computer is the cluster resource writer of the storage region, initiate a repair operation to the reallocated storage regions.

24. A memory device not comprising an electromagnetic signal, the memory device storing instructions that, when executed by a processor of a device having access to storage devices, represent the storage devices by:

installing on the computer a storage device driver comprising instructions configured to, when executed on the processor, cause the computer to:
    generating a storage region representation of respective storage regions of storage devices;
    for respective storage pools comprising at least one storage region of at least one storage device:
        claiming the storage region representations of the storage regions of the storage devices involved in the storage pool;
        applying the storage device relationship to the storage pool; and
        generating a pooled storage region representation of the storage pool; and
    for respective pooled storage region representations, generating a logical representation of the storage region represented by the storage region representation.

\* \* \* \* \*